(12) United States Patent
Lee et al.

(10) Patent No.: US 6,400,370 B1
(45) Date of Patent: Jun. 4, 2002

(54) STOCHASTIC SAMPLING WITH CONSTANT DENSITY IN OBJECT SPACE FOR ANISOTROPIC TEXTURE MAPPING

(75) Inventors: Harry Lee, Maitland; Stuart Krupnik, Casselberry; Richard Economy, Ormond Beach, all of FL (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/393,477

(22) Filed: Sep. 10, 1999

(51) Int. Cl.[7] ............................................... G06T 11/40

(52) U.S. Cl. ................................................... 345/586

(58) Field of Search ................................ 345/418–420, 345/428–432

(56) References Cited

U.S. PATENT DOCUMENTS 6,005,582 A * 12/1999 Gagriel et al. .............. 345/430

OTHER PUBLICATIONS

\R Dipp\'e, Mark A., and Erling Henry Wold. "Antialiasing Through Stochastic Sampling" [online], pp. 69–78, [online], SIGGRAPH 1985, [retrieved on May 2, 2001], [retrieve from: http://www.cg.tuwien.ac.at/~wonka/DIPL/RESULTS/LINKS_6/rtabs].*

* cited by examiner

Primary Examiner—Jeffery Brier
Assistant Examiner—G. F. Cunningham
(74) Attorney, Agent, or Firm—Scully, Scott, Murphy & Presser

(57) ABSTRACT

A method and apparatus, in a computer graphics display system, for producing Anisotropic Texture using constant density object space stochastic sampling. The approach of this invention uniformly samples the footprint of the pixel as mapped into a texture array to determine what complete and fractional texels are covered by the pixel's projected footprint. The sample density remains a constant and is determined by the area of the pixel footprint projection in texture space. Due to variations in footprint projections, each pixel may require a different number of samples, but the sample per texel density remains approximately constant. The intensity is the average of the sample points within the footprint.

19 Claims, 22 Drawing Sheets

Shaded texel areas have not been sampled.

Substantially dominant axis aligns with texel grid

Viewpoint is shifting right, sample points about to cross texel boundary

Sample points have crossed texel boundary, white texels are no longer.

White texels reappear in image

Shaded texel areas have not been sampled

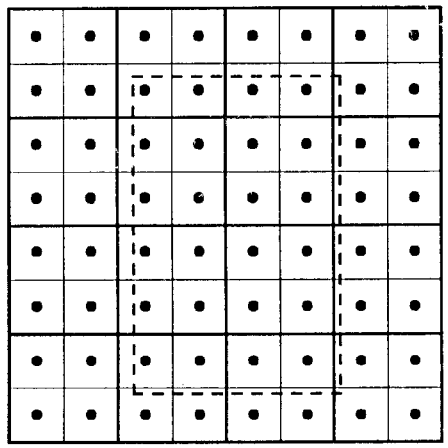 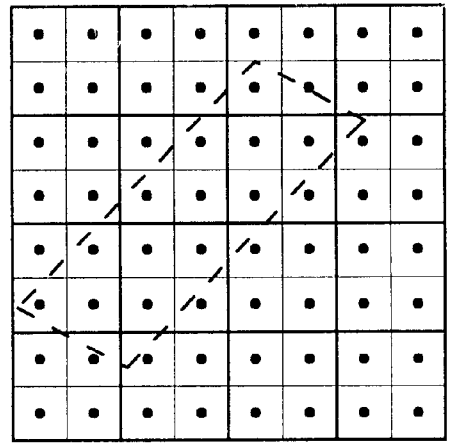
Figure 4(a)
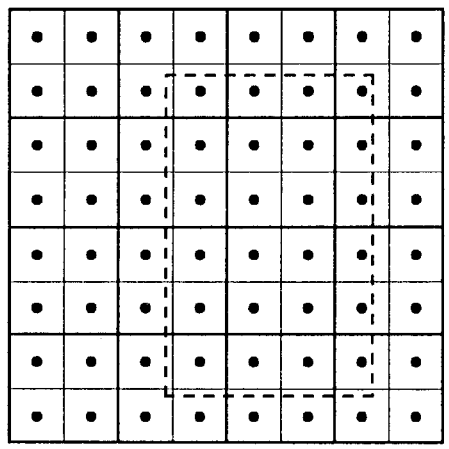 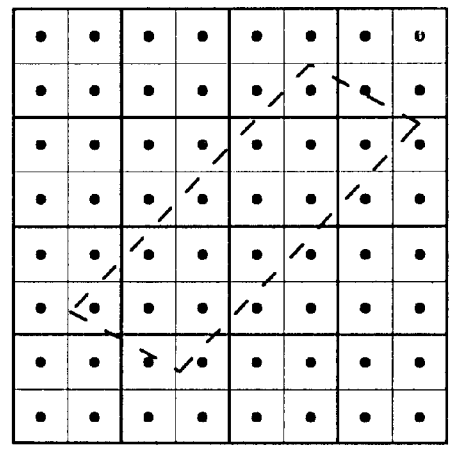
Figure 4(b)

Flow Diagram of Stochastic Point Sampling with Constant Density in Object Space for Anisotropic Texture Mapping Pixel Foot Print Projection in Object or Texture Space Gradients Measuring the Rate of Change in Screen Coordinates Determine Pixel Foot Print in Texture Coordinates.

Determine bounding box (BB) and the maximum direction of BB $S_{max} = \max(s1, s2, s3, s4)$ $t_{max} = \max(t1, t2, t3, t4)$ $S_{min} = \min(s1, s2, s3, s4)$ $t_{min} = \min(t1, t2, t3, t4)$ $\Delta_s = S_{max} - S_{min}$ $\Delta_t = t_{max} - t_{min}$ $\Delta_{max} = \max(\Delta_s, \Delta_t)$ and direction, $s$ or $t$ Determining Bounding Box and Maximum Direction Scaling the Bounding Box's
Longer Side to One Texel in Size.

Scaling the Bounding Box's
Shorter Side to One Texel in Size.

Scaling the Bounding Box's
Diagonal to One Texel in Size.

Scaling the Pixel Foot Print's Longer Side to One Texel in Size.

Scaling the Pixel Foot Print's Shorter Side to One Texel in Size.

Scaling the Pixel Foot Print's Major Diagonal to One Texel in Size.

Scaling the Pixel Foot Print's Minor Diagonal to One Texel in Size.

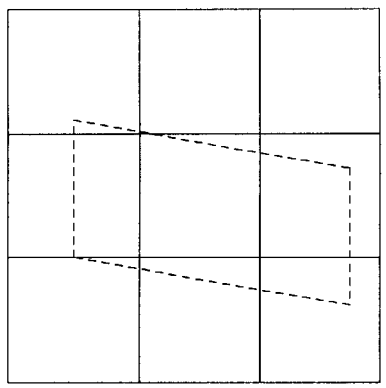
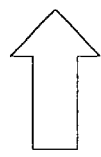
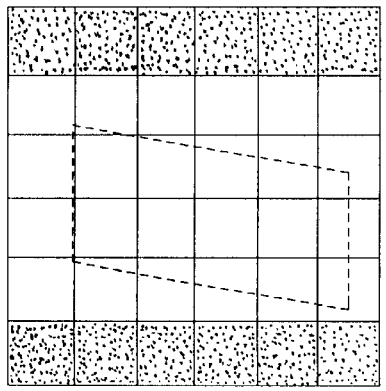
Figure 13(a) — 24 Texels Needed LOD n+1 -> 9 Texels
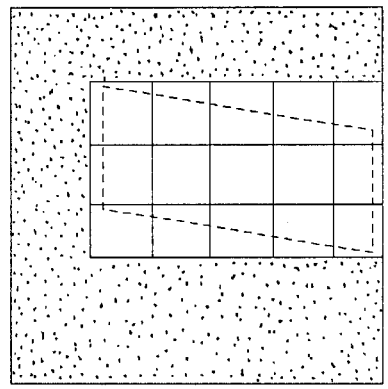
Figure 13(b) — Same foot print area, 15 Texels Needed LOD n is Satisfactory

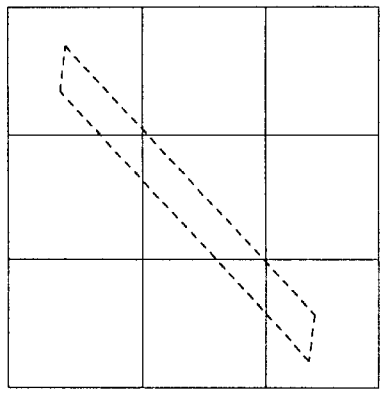
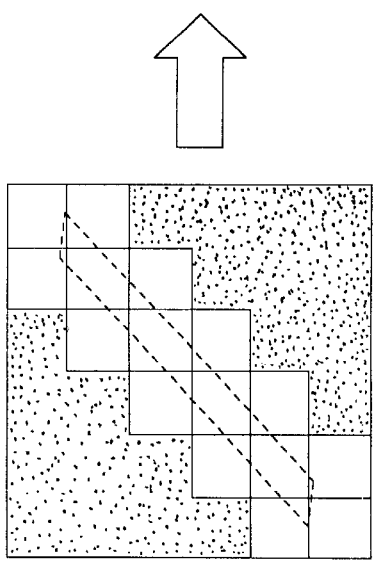
Figure 13(c)
16 Texels Needed LOD n+1 -> 9 Texels
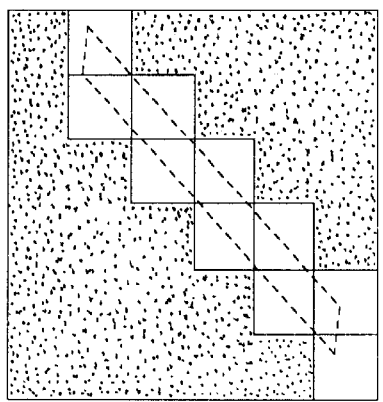
Figure 13(d)
Same foot print area, 10 Texels Needed LOD n is Satisfactory Sample Within the Texel Neighborhood Sample Only Within the Pixel Foot Print Un-Normalize Line Equation Can Be
Used to Determine Point Locations

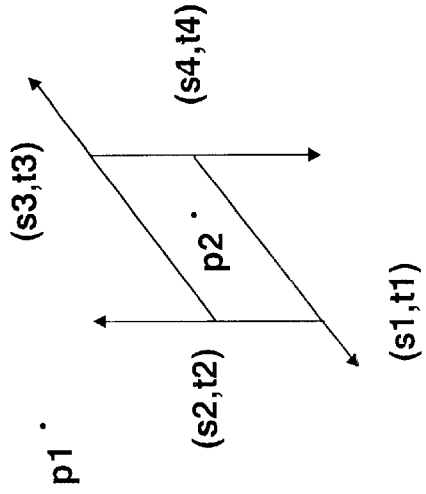

- The foot print of a pixel in texel space can be approximated by a parallelogram

- Each of the 4 sides of the parallelogram is a line which described by a UNLE

- A point is inside the parallelogram or foot print if all UNLE's yield a positive value
  - p2 is inside (++++)
  - p1 is outside (--++)

- If the UNLE is positive one of the 4 bits associated with the point is set to 1

- This process is done for each line equation

- Those points with a value of 1111 or 15 are said to be inside the pixel foot

Determining if a Point is Inside or Outside a Polygon

Figure 16

Relationship of Parallel Lines Using the Un-Normalize Line Equation

STOCHASTIC SAMPLING WITH CONSTANT DENSITY IN OBJECT SPACE FOR ANISOTROPIC TEXTURE MAPPING

BACKGROUND OF THE INVENTION

The present invention generally relates to computer graphics display systems, and more particularly, to techniques for applying texture to objects that are shown in the display. Even more specifically, this invention relates to a procedure for producing anisotropic texture using constant density object space stochastic sampling.

Many modern computer systems are able to display complex three-dimensional objects on display devices that are controlled by the computer systems, and commonly these complex objects are displayed interactively to allow the computer user to manipulate the objects. Well known graphics techniques for rendering these three dimensional objects such as Gouraud shading, hidden surface algorithms, clipping, filling polygons and coordinate transformations are used to generate the displayed object on a suitable device, such as a CRT video display that is controlled by the computer system.

Typically, in the operation of these computer systems, a polygon representation of the object is converted to a raster scanned image that is stored in a frame buffer. Usually, various parameter values, such as color, depth and translucency, are given for the vertices of the polygon, and in a process referred to as scan conversion, the computer uses the given values to compute values for these parameters for the pixels inside the polygon. The computed values are stored in the frame buffer at the resolution of the display device; and from that frame buffer, these values may be used to produce an image of the object on the display device.

Texture mapping is a commonly employed technique for adding detail in computer graphics rendering to achieve a high degree of realism in the rendered image. With this technique, image data needed to show the surface text for various objects, such as a road, the sky, a wheat field, or a brick wall, are stored in data arrays, referred to as texture maps, in the computer memory. When one of these objects is shown on the video display, data is obtained from the corresponding texture map and used to show the object on the display device with the desired surface texture.

In a common, simple texturing procedure, texture coordinates are specified for the vertices of each drawing polygon. These texture coordinates identify locations in the relevant texture map. As the polygon is rasterized pixel-by-pixel, these specified texture coordinates are used to determine, usually via an interpolation process, texture coordinates for each pixel. Then, as the image datum value for each pixel is being determined, the contents of the texture map are fetched, by means of the computed texture coordinates for that pixel, and used in the determination of that image datum.

Conventional texture mapping approaches used in real time and interactive graphic systems cannot achieve a quality texture mapping for shallow viewing angles of textured objects. This difficulty is demonstrated by a well-known example, referred to as the white line down the center of the road problem. In this example, the display system shows a white line down the center of a road. The white line is actually a series of white line segments, each segment is about ten feet long and five inches wide, and the line segments are separated by ten feet of black pavement. In showing this white line, the display system attempts to achieve two conflicting goals. The first goal is to keep the white line from disappearing as the viewer looks down the road, and the second goal is to prevent the white line from scintillating. Scintillation is manifested by the white line appearing for several segments (e.g., 50 feet), and disappearing for several segments (e.g., 50 feet).

Related problems are encountered when the display system attempts to show a building corner at a shallow angle. This building feature can be shown sharply when it directly faces the viewer, but the feature either scintillates or appears fuzzy when viewed at a shallow angle. As explained in greater detail below, these problems with conventional texturing systems are caused by the fact that the system does not account for the pixel's elongated footprint when the pixel is projected, or mapped, onto the texture map.

Texture maps are described in detail in U.S. Pat. No. 4,727,365, the disclosure of which is incorporated herein by reference. Generally, texture maps are organized into sets or series, with each set having a number of individual texture maps, referred to as Levels of Detail or LODs. Typically, each set has a base or highest resolution map, and successive maps in the set are reduced resolution versions of that base map. This base map is often referred to as LOD(0), and the successively lower resolution maps in the set are referred to as LOD(1), LOD(2), LOD(3), and so on. Commonly, each of these successive maps is a 2- to -1 reduction in each of the two dimensions of the previous map in the set. Thus, for example, if the base, or highest resolution, texture map in a set is 512 by 512 texels, then LOD(1) is a texture map that is 256 by 256 texels (individual elements of a texture map). Subsequent texture maps can continue to be formed until LOD(9) is produced, which would be a map that is 1 texel by 1 texel.

In the texturing process, the pixel is, in effect, projected onto a texture map, a process referred to as mapping the pixel into texture space. Then, two LOD values are determined based, respectively, on the width and the length of the projection of the pixel onto the texture map. The larger of these two values is taken as the effective, or actual, LOD value for the pixel.

After an LOD value is determined for a pixel, a texture value may be calculated for the pixel using any of a number of specific procedures. For instance, after the LOD value is calculated, the two texture maps with integer LODs that bracket the pixel's effective LOD value may be determined. Interpolation between adjacent texels in one or both of these LODs may be performed to calculate the value of the mapped pixel. Examples of current methods used to calculate pixel intensity include procedures referred to as nearest texel neighbor, bi-linear interpolation using texels in one of the integer LODs, and tri-linear interpolation uses bi-linear interpolation on two adjacent LODs and linearly blends the results from each of the bi-linear interpolations.

These forms of texture mapping are said to be isotropic, since the LOD value for the projected pixel is assumed to be equal along both the length and the width of the projection of the pixel onto the texture map. This isotropic assumption produces excellent results for pixels that project substantially orthogonally onto a textured surface. However, this assumption may produced some errors for pixels with elongated projections onto the texture map, for instance as shown in FIG. 1.

Anisotropic texture approaches that account for a projected pixel's elongated shape in texture space have been implemented, but only for non real time systems. Such approaches fall into two broad categories: 1) methods for convoluting the pixel's projection in texture space with the texture values, and 2) methods using the storage of preprocessed and pre-filtered textured maps. The former methods can be very accurate but computationally very expensive. The latter methods require less computations than the former, but are less flexible, less precise, and are memory intensive.

Because of an increasing demand for more and more different textures maps to be available in a graphics display system for real time and interactive applications, the texturing approaches that are less memory intensive are more desirable.

U.S. Pat. No. 5,651,104 for "Computer Graphics System And Process For Adaptive Supersampling" addresses the problem of anisotropic texture mapping. FIG. 1 shows the projection of a pixel onto a texture map. This patent suggests sampling regularly along the substantially longitudinal axis of the pixel's projection onto the texture map. Several difficulties arise, though, when sampling in the prescribed manner. A first difficulty is that the samples will miss texture variations that are off that longitudinal axis. To elaborate, with this procedure, when the pixel is projected into texel space, regular samples are taken from the texture map along the substantially longitudinal axis of the pixel projection. Some texels will not be sampled, and other texels will be sampled multiple times.

Another difficulty with this prior art approach is that scintillation will normally occur when the sampling axis is parallel to the texture grid. In this situation, as motion is introduced to an image, there are times when all of the sample points switch texels at the same time. As an example, when the image is that of a roadway with a line extending along the roadway center, if the viewpoint is shifted slightly to the right and then back to the left, the line may suddenly disappear from and then reappear in the image.

Another problematic situation occurs when the projection of the pixel onto the texture map, referred to as the pixel footprint, has a diamond shape. A first specific difficulty with this situation is deciding which of the footprint axes to choose, since both axes are of equal length. A second difficulty is a lack of correct sampling, as demonstrated in FIG. 2.

Several previous patents, including U.S. Pat. Nos. 4,897, 806, 5,025,400, and 5,239,624, have addressed the pseudo-random point sampling of pixels, but these references are directed to the anti-aliasing aspect of polygon edges. Neither the texture anti-aliasing nor the isotropic vs. anisotropic texture filtering concepts are discussed in these patents.

These patents suggest the use of stochastic samples throughout the pixel. In particular, these references describe techniques in which these sample points are constrained such that a Fourier transform over a distribution of the sample points over an infinite extent contains substantially continuous regions. The requirement of a substantially continuous Fourier transform distribution over an infinite extent of samples in pixel space (screen space) does not guarantee or generate appropriate anisotropic texture mapping in object space.

A continuous Fourier distribution constraint on sub-pixel sample point locations in screen space does not provide for a variation of samples per pixel as a function of the number of texels covered by the projection of the pixel in texture space. When the pixels project into texture space, they are usually elongated, and this method will under-sample the pixel. If the number of samples in each pixel is increased to compensate for this under-sampling, then other pixels will be oversampled. Specifically, with reference to FIG. 3, those pixels whose projection covers only a few texels, or even less than a texel, will be oversampled. This oversampling wastes system resources, as well as time.

An improved anisotropic texturing procedure is disclosed in copending U.S. patent application Ser. No. 08/975,133, for "Anisotropic Texture Mapping Using Silhouette Footprint Analysis Image Generation System," the disclosure of which is herein incorporated by reference. This texturing technique uses a constant sample density, regularly spaced in each texel. Aliasing occurs when this method is used, however, when the texel grid and the pixel footprint are parallel. With this procedure, as particularly illustrated in FIG. 4, as the viewpoint shifts slightly from one frame to the next frame, a whole set of sample points that are included in the first frame are excluded from the next frame. This results in scintillation caused by an abrupt color shift, as opposed to a more gradual shift in color over several frames.

SUMMARY OF THE INVENTION

An object of this invention is to provide a computationally efficient, high fidelity texture mapping procedure.

Another object of the present invention is to provide an anisotropic texture mapping procedure using stochastic sampling with constant density in object space.

A further object of this invention is to use stochastic sampling to prevent scintillation when an anisotropic texture mapping procedure is used in a computer graphics display system.

These and other objects are attained with a method and apparatus, in a computer graphics display system, for mapping texture anisotropically onto a group or set of pixels. The method and apparatus are for use with a computer graphics display system that has texture values that form a texture map including an array of texels. The method comprises the steps of, for each of the pixels, determining a footprint for the pixel on the array of texels, using a stochastic sampling procedure to identify locations for a multitude of sample points in that footprint, and maintaining the density of the sample points approximately constant throughout the footprint. The method further comprises the steps of assigning a value to each of the sample points based on the location of the sample point on the array of texels, and determining a pixel intensity value using the values assigned to the sample points.

With a preferred embodiment of the invention, like the silhouette method, a pixel is mapped into an LOD texture map based on the number of texels a given footprint projection encompasses. A texel neighborhood is selected, based on texture memory bandwidth limitations; and this neighborhood can be selected in square spans, in rectangular spans, or selectively, based on the number of texels needed and the memory fetch capabilities.

Samples are then taken, stochastically, with a set density in texel space. The locations of the stochastic samples can be generated during run time, or can be fetched from a look-up table containing a previously generated pattern. The sample points are arranged within the pixel footprint, and an average pixel intensity is computed from values obtained from all of the samples.

The present invention provides a computationally efficient process of averaging all the texels and fractional texels that fall inside the pixel footprint and determines a single value for the mapped pixel. This texture mapping procedure retains the high fidelity of the more precise method of convolving the pixel's projected area with all of the covered and fractional texels of the highest resolution texture map but without the associated computational complexity.

Further benefits and advantages of the invention will become apparent from a consideration of the following detailed description, given with reference to the accompanying drawings, which specify and show preferred embodiments of the invention.

BRIEF DESCRIPTION OF THE DRAWINGS

FIG. 4 illustrates how groups of regularly spaced sample point can be included in and then excluded from a pixel projection at two different times.

FIG. 13 illustrates a procedure for determining the texture LOD level for the pixel being processed.

FIG. 15 illustrates how an un-normalized line equation can be used to determine which side of a line a point is on.

FIG. 16 illustrates how the un-normalized line equation can be used to determine whether a sample point is inside or outside a polygon.

DETAILED DESCRIPTION OF THE PREFERRED EMBODIMENTS

Figure 1:
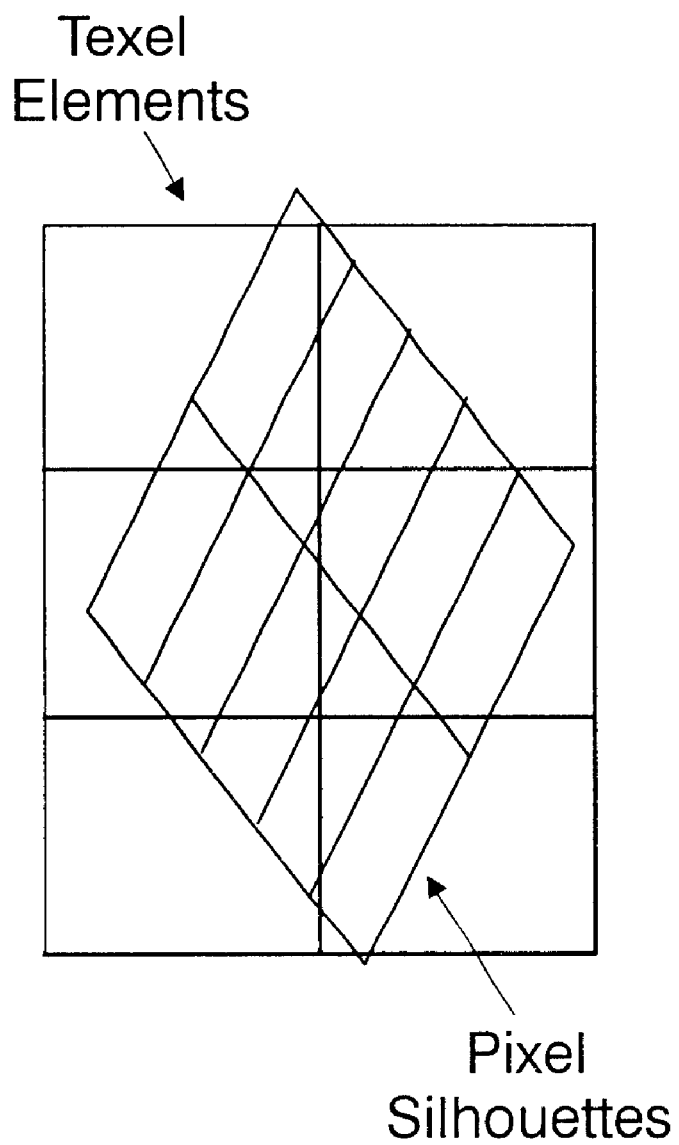
FIG. 1 shows the projection of a pixel onto a texture map.
Figure 2A:
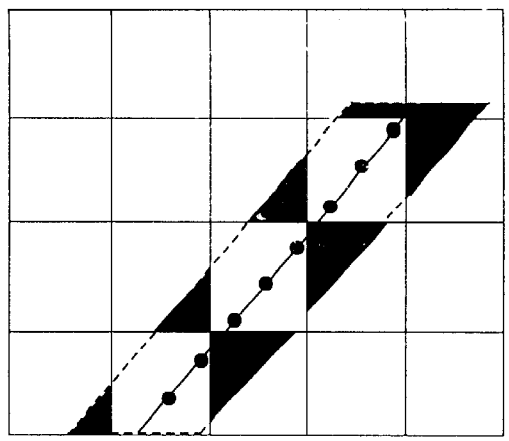
FIG. 2 shows the projections of several pixels onto texture maps, and illustrates various ways to arrange sample points relative to those pixel projections.
Figure 2B:
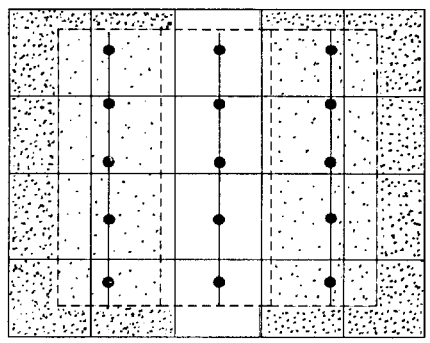
Figure 2C:
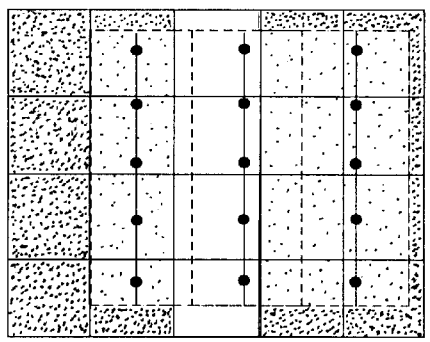
Figure 2D:
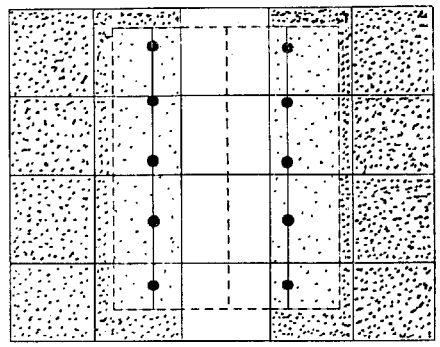
Figure 2E:
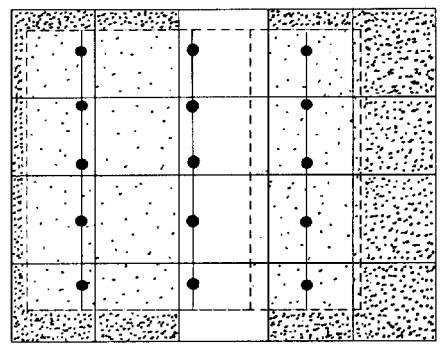
Figure 2F:
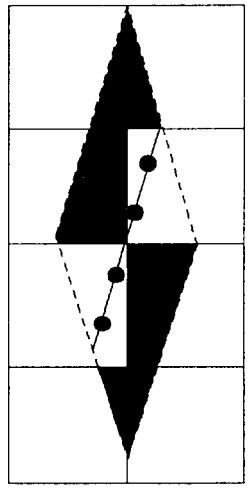
Figure 3A:
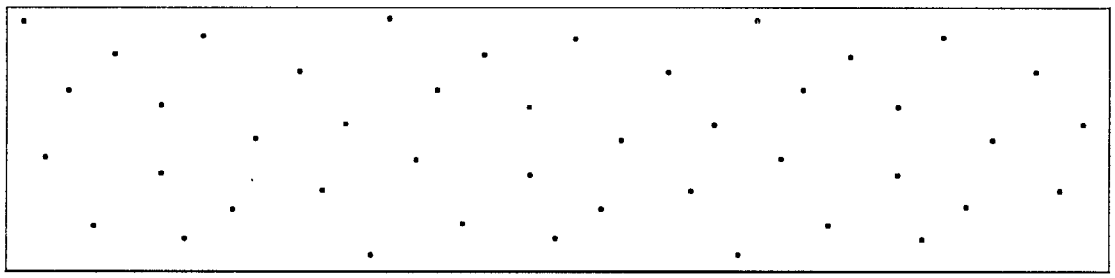
FIG. 3 shows random sample points that are approximately evenly distributed over each of two pixel projections.
Figure 3B:
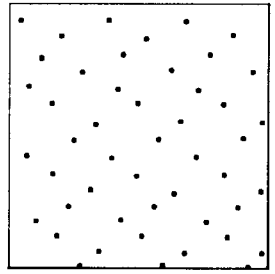
Figure 5:
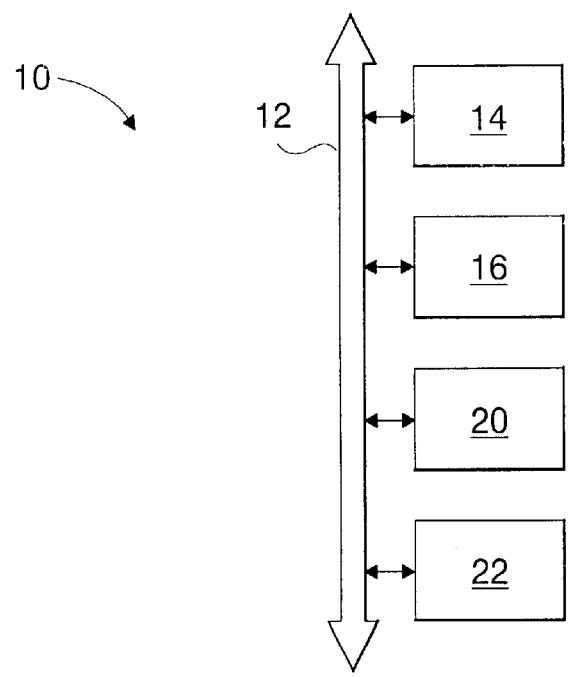
FIG. 5 schematically illustrates a computer graphics system that may be used to embody the present invention.

Computer system 10 illustrated in FIG. 5 includes a bus 12 for communicating information, a processor 14 coupled with the bus for processing information, and a memory 16 such as a RAM that is coupled with the bus for storing information and instructions for the processor. System 10 further includes video display device 20, such as a CRT raster scan device, and a data storage device 22, such as a magnetic disc, coupled with the bus 12 that is also used to store information and instructions.

Alternative computer systems having specifically designed graphics engines are well known in the art. Commonly, these alternative computer systems modify the system of FIG. 5 by incorporating a specialized graphics subsystem that includes a graphics processor, a dedicated frame buffer, often in the form of video DRAM, and a video display.

Figure 6:
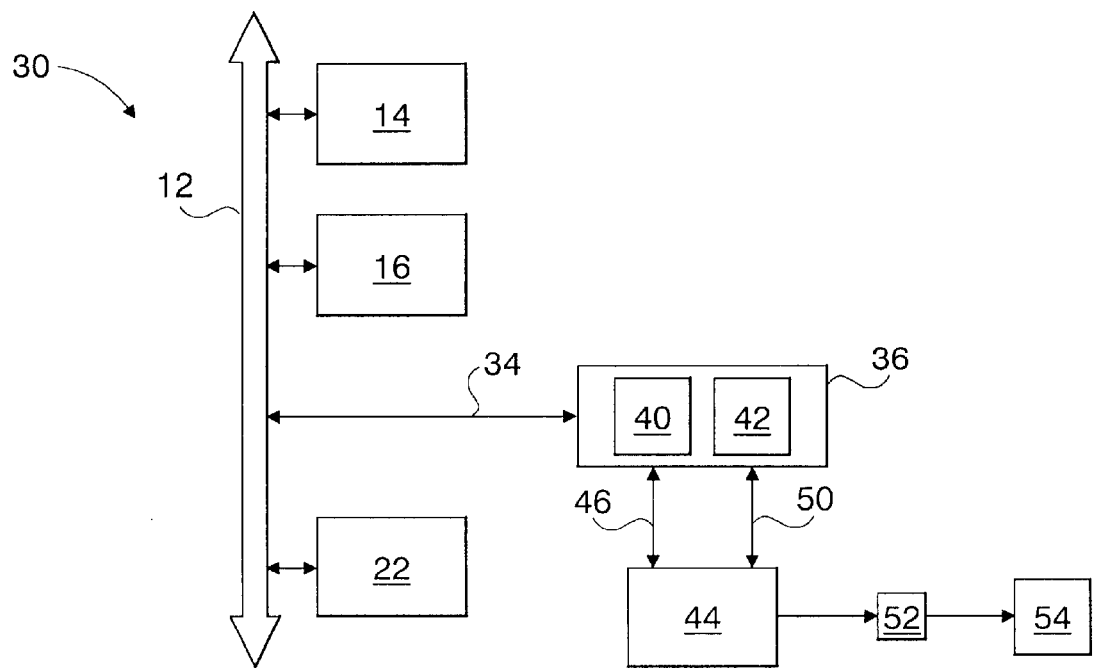
FIG. 6 shows another computer graphics system that may be used to embody this invention.

FIG. 6 shows an example of a computer system 30 having a graphics subsystem 36. In this system 30, input image data from the main processor 14 are communicated over bus 12 and bus 34 to the graphics processor 36. This image data are typically in the form of graphics primitives such as lines, points, polygons or character strings. The graphics processor 36 receives that input image data from the main processor 14 and uses that data to create a complete image data set utilizing well known graphics techniques such as coordinate transformation, clipping, Gouraud shading and hidden surface algorithms.

The image data developed by the graphics processor 36 is stored in video RAM 44, which typically includes the frame buffer. Graphics processor 36 addresses the video ram 40 over the address bus 46 while supplying the video information over bus 50. Periodically, the output of the video RAM is read out to a digital to analog converter 52 and then to a video display device 54 or to other raster scan display devices.

In the operation of system 30, polygon information, in the form of parameter values for each vertex of a polygon is typically received by the graphics processor 36. Alternatively, that information could be calculated by the graphics processor. In either case, coordinate values for these polygon vertices are then converted by processor 36, using well known transformation techniques, to the output device coordinate space at subpixel resolution. Then, the scan conversion and filling of the polygons occurs.

As previously mentioned, texture mapping is a commonly employed technique for adding detail in computer graphics rendering to achieve a high degree of realism. In accordance with the present invention, a unique, high fidelity procedure is provided to apply texture to objects in the displayed image. Generally, with this procedure, in order to determine the pixel intensity value for a pixel, that pixel is projected onto a texel array to form a pixel footprint on that array. Then, a stochastic sampling procedure is used to identify locations for a multitude of sample points in the footprint. These points are located such that the density of the sample points is approximately constant throughout that footprint. Next, a value is assigned to each of the sample points based on the location of the sample point on the array of texels, and then the values assigned to these sample points are used to determined an intensity value for the pixel.

Figure 7A:
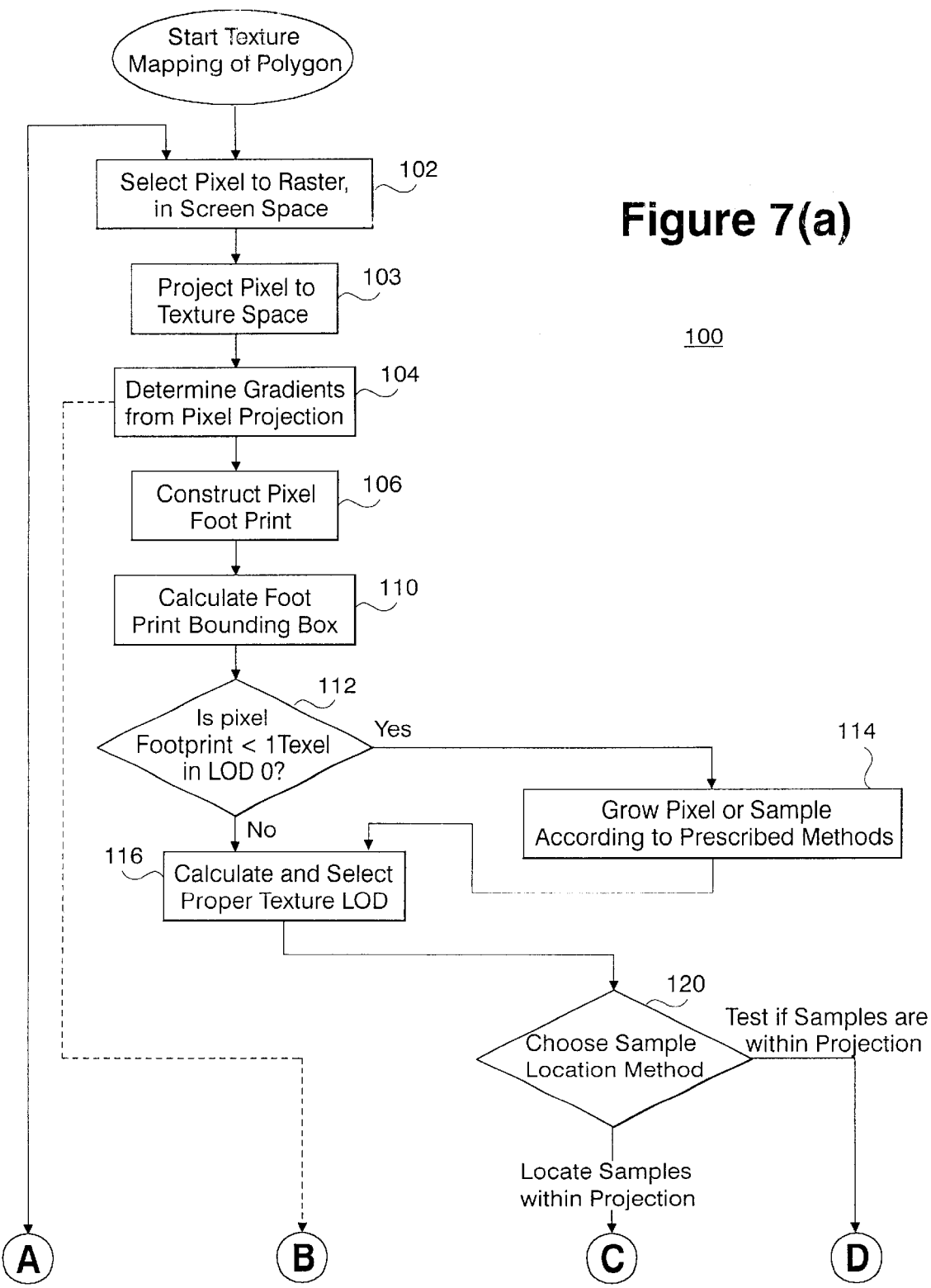
FIG. 7 is a flow chart illustrating the general operation of a preferred embodiment of this invention.
Figure 7B:
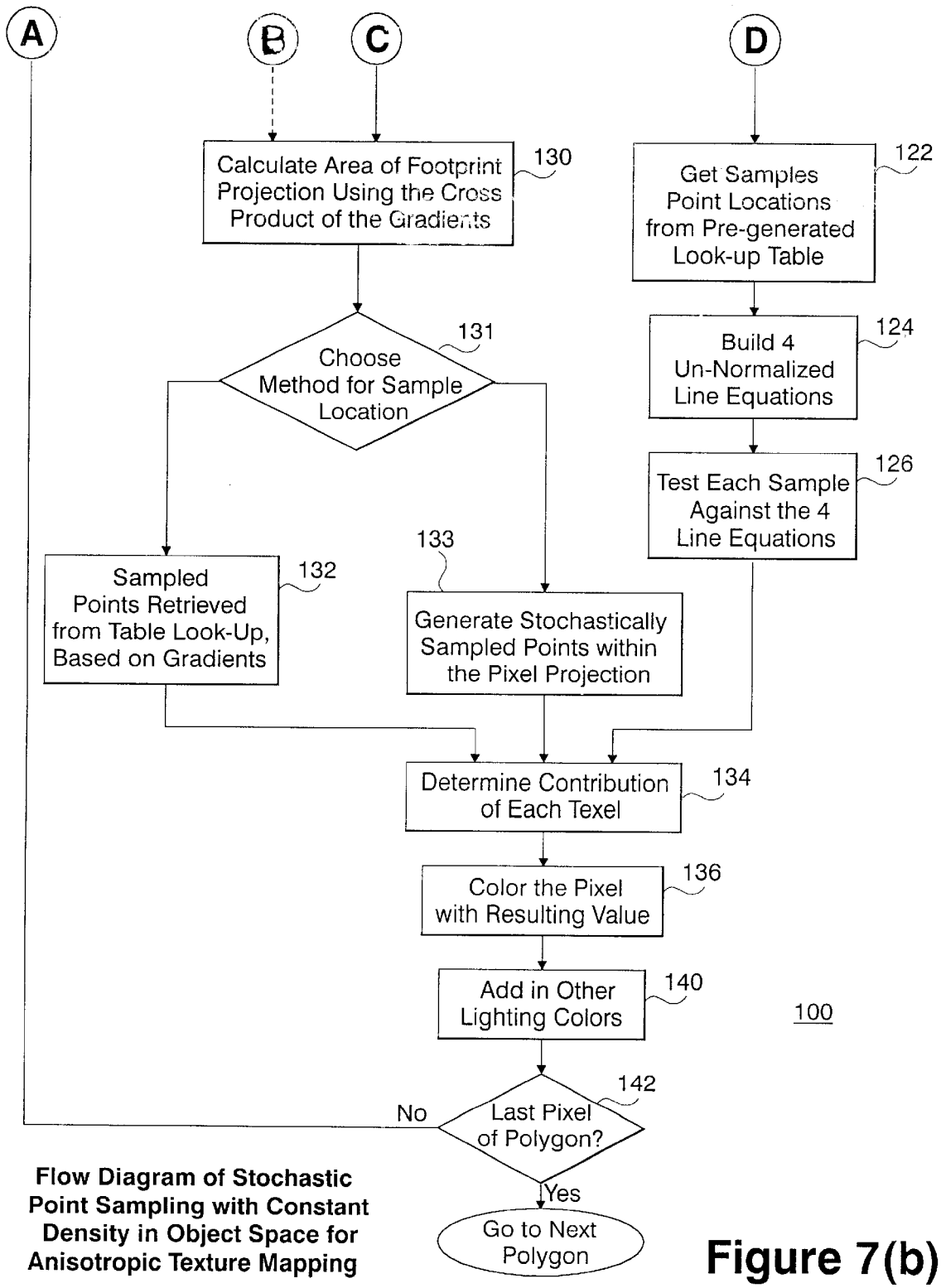

FIG. 7 shows a flow chart 100 outlining a, preferred embodiment of the texturing procedure of this invention. In addition, FIGS. 8–17 pictorially or diagrammatically illustrates various aspects of the texturing procedure.

Figure 8:
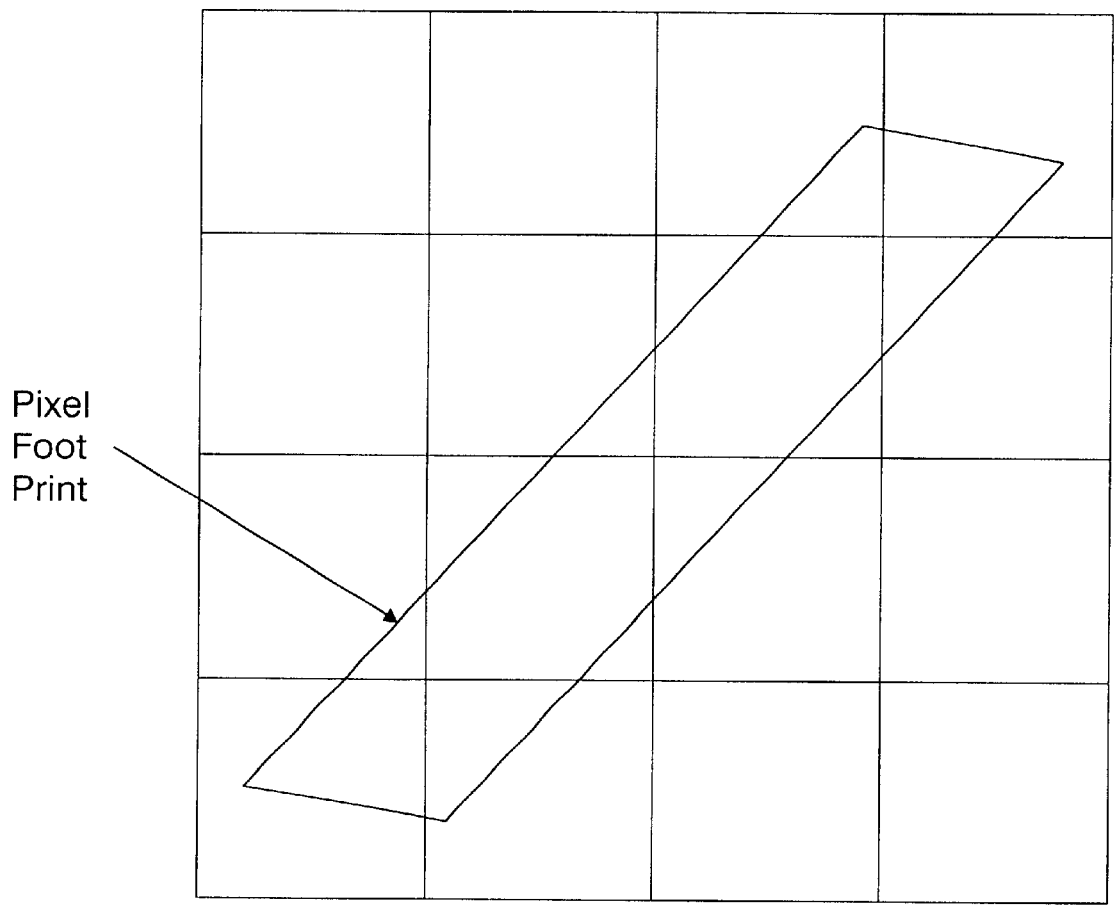
FIG. 8 also shows the projection of a pixel onto a texel grid.
Figure 9:
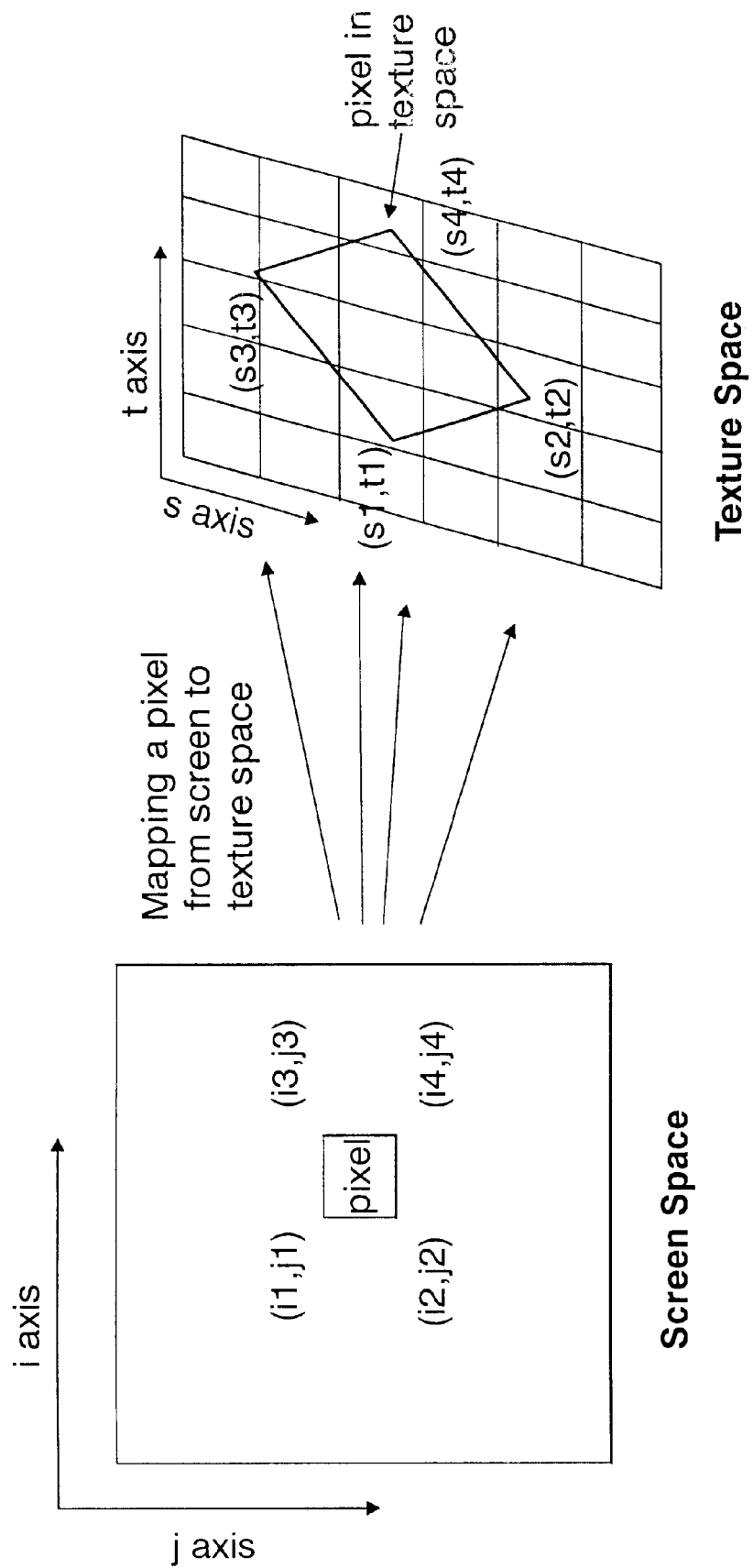
FIG. 9 pictorially illustrates the mapping of a pixel onto a texture map.
Figure 10:
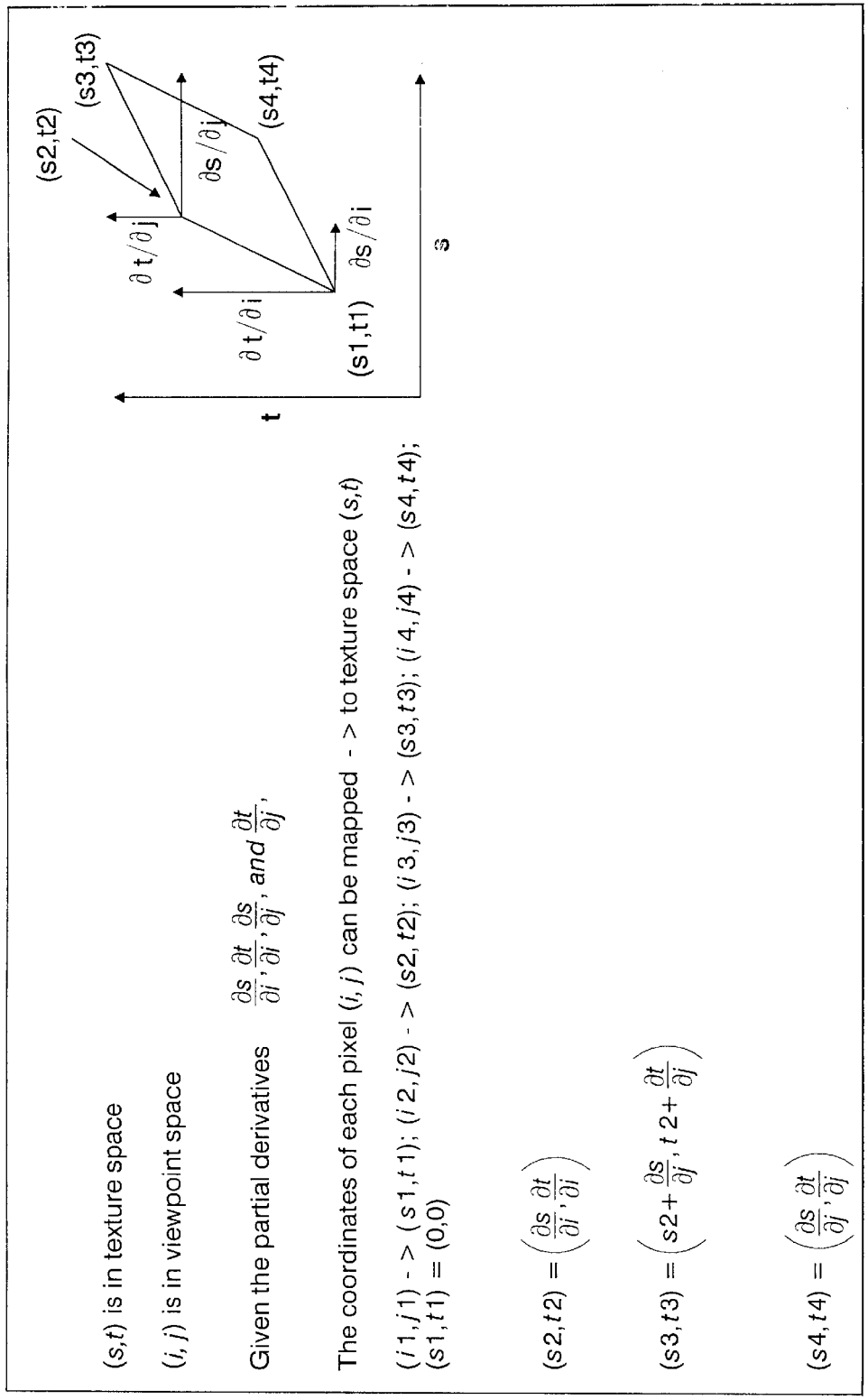
FIG. 10 illustrates how various gradient values may be used to determine the size of the projection of the pixel onto the texture map.

With particular reference to FIGS. 7–9, the first steps in the process, as represented by steps 102, 104 and 106, are to project a pixel onto the texture map. This is done by circuit element 103 of FIG. 7. One of the first steps in the procedure is to determine the coordinates of the pixel footprint mapped into texture space (s, t), as shown in FIGS. 9 and 10. Specific for a quadrilateral pixel footprint, these texture coordinates are (s1,t1), (s2,t2), (s3,t3), and (s4,t4). Preferably, this is accomplished by mapping from screen space to texture space, as illustrated by FIG. 9.

Once the coordinates are determined in texture space, the next step in the process, as represented by step 110 of FIG. 7, is to compute the bounding box and the pixel projection's major (larger) diagonal. This box just encloses the pixel footprint, as shown in FIG. 12.

Figure 11:
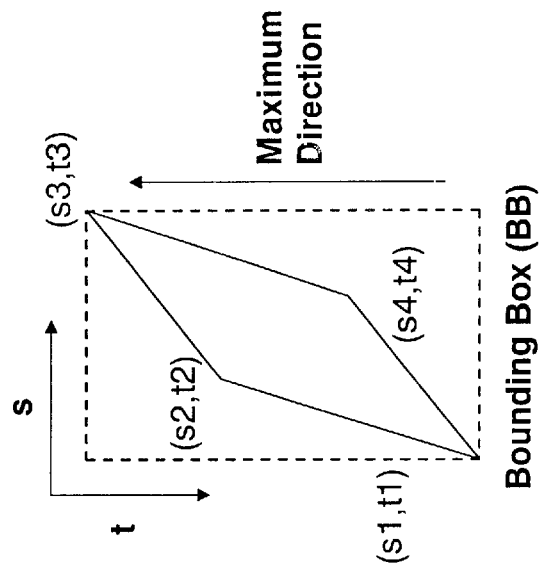
FIG. 11 shows a box that bounds the pixel projection.
Figure 12A:
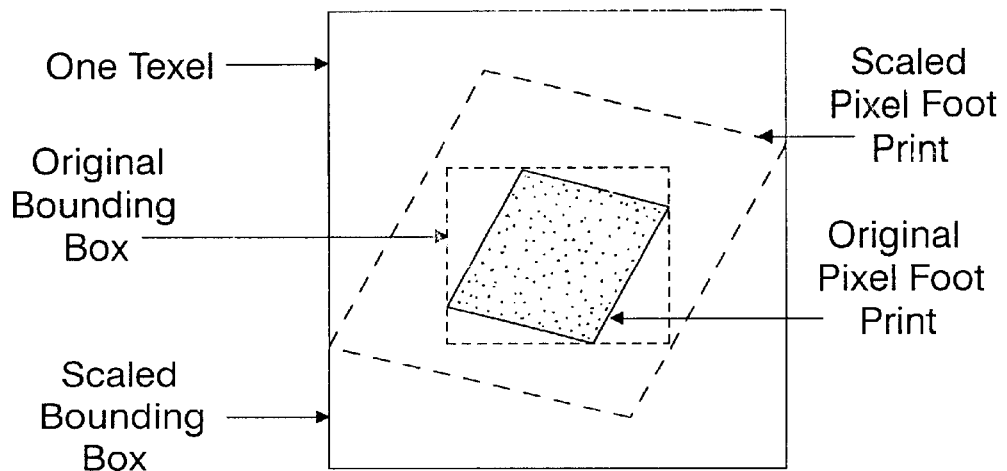
FIGS. 12a–12g illustrate several procedures for clamping the size of the bounding box.
Figure 12B:
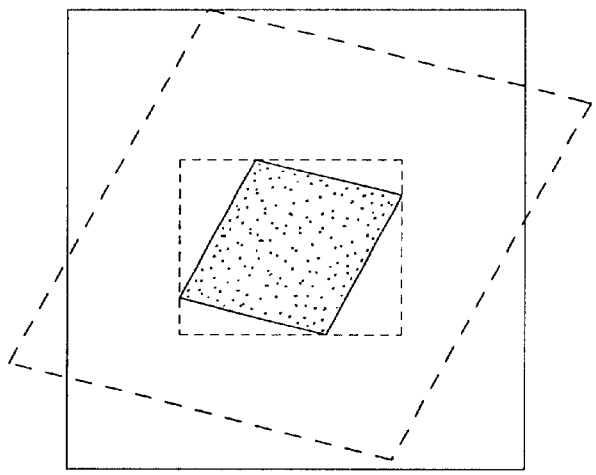
Figure 12C:
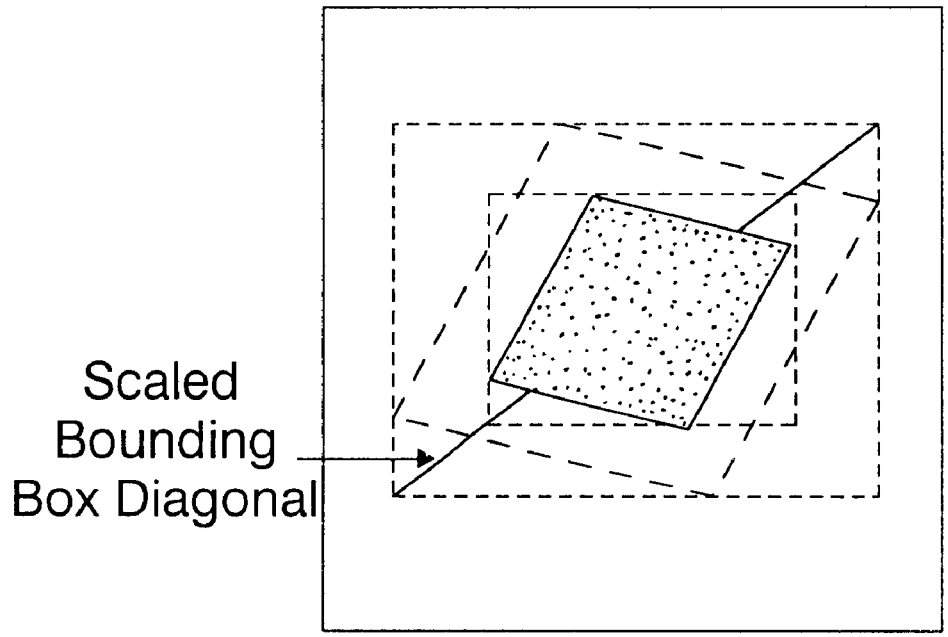
Figure 12D:
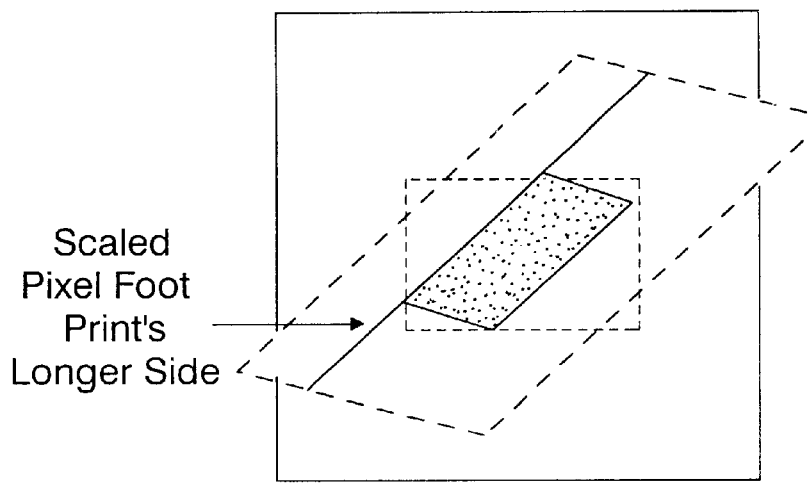
Figure 12E:
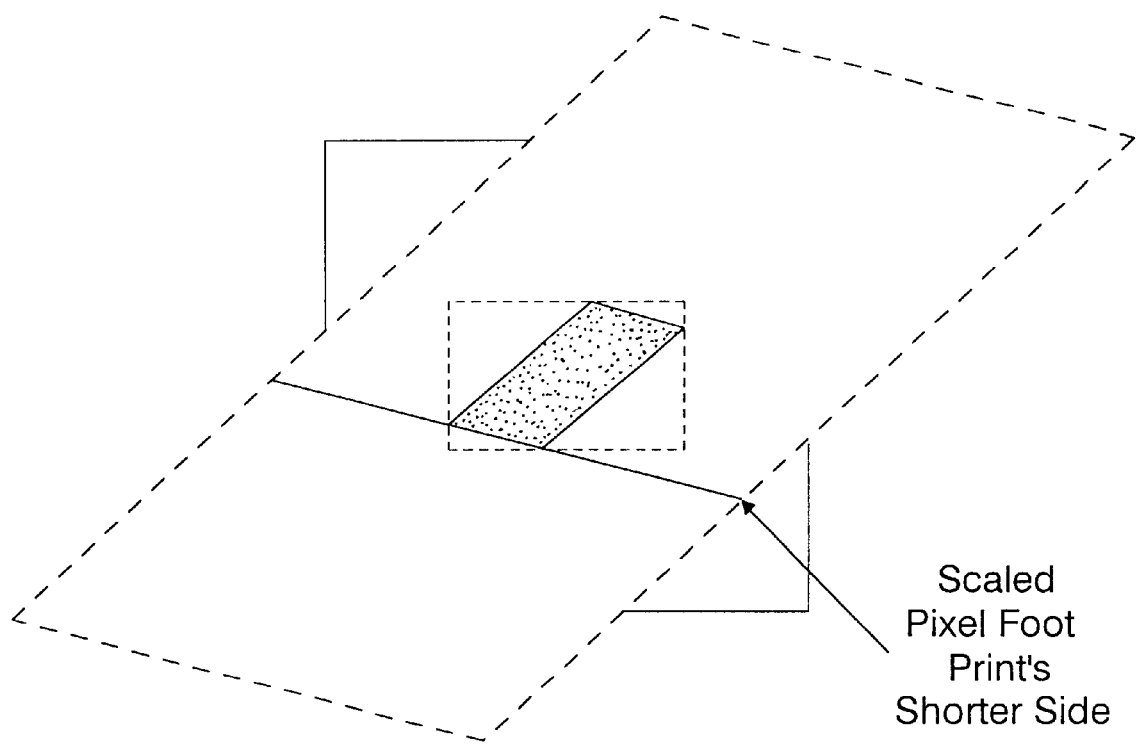
Figure 12F:
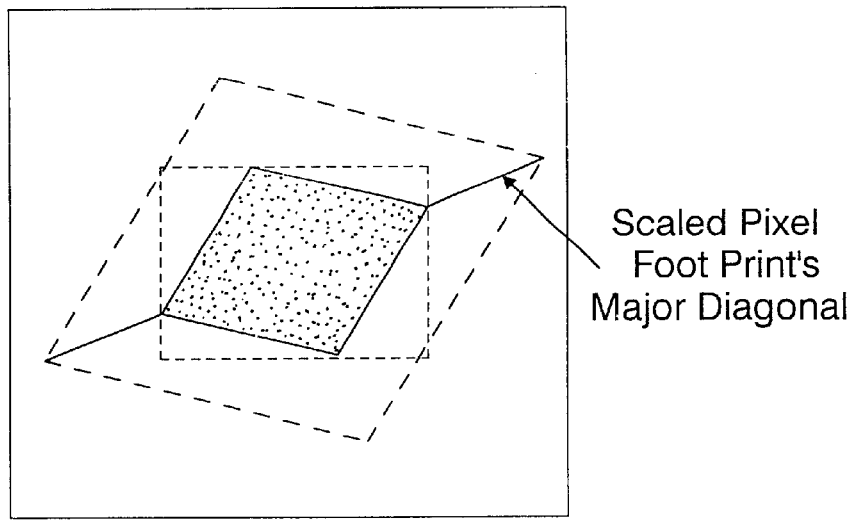
Figure 12G:
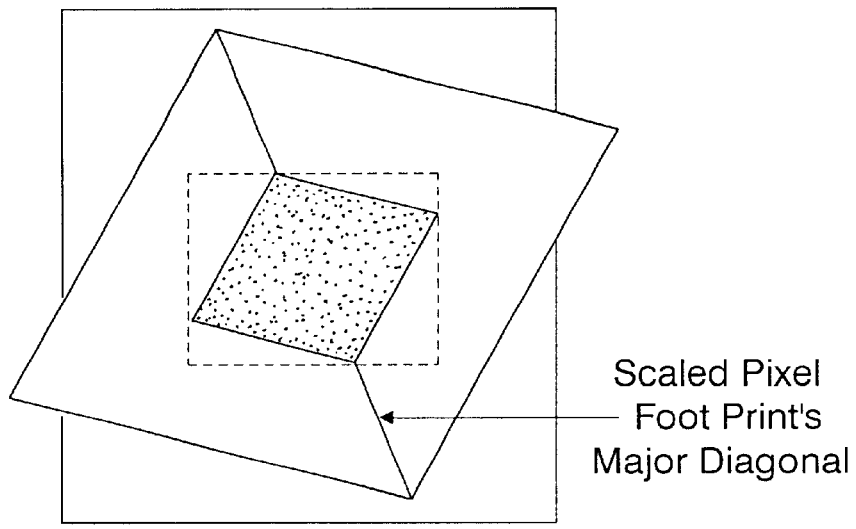

FIG. 11 illustrates one procedure for determining a bounding box and the maximum direction of the bounding box. In the procedure illustrated in FIG. 11, the coordinates of the four corners of the pixel are $(s_1, t_1)$, $(s_2, t_2)$, $(s_3, t_3)$ and $(s_4, t_4)$. The coordinates of the four corners of the bounding box are $(s_{min}, t_{min})$, $(s_{min}, t_{max})$, $(s_{max}, t_{min})$ and $(s_{max}, t_{max})$. These s and t values are determined by the equations:

$$s_{max}=\max(s_1,s_2,s_3,s_4)$$

$$t_{max}=\max(t_1,t_2,t_3,t_4)$$

$$s_{min}=\min(s_1,s_2,s_3, s_4)$$

$$t_{min}=\min(t_1, t_2, t_3, t_4)$$

The maximum direction of the bounding box, $\Delta_{max}$, is given by the equation:

$\Delta_{max}=\max(\Delta_s, \Delta_t)$ and direction, s or t, where $\Delta_s = s_{max} - s_{min}$ and $\Delta_t = t_{max} - t_{min}$ Next, at step 112 of FIG. 7, the pixel footprint is compared to the texel size. If one or more of the dimensions of the pixel's footprint is smaller than one texel of the highest level of detail texture map, then that dimension of the pixel's footprint is scaled or clamped to a minimum size, as represented by step 114 of FIG. 7. This minimum size is determined by the size of a texel in the maximum resolution LOD.

By scaling the pixel footprint, it is not necessary to have additional hardware to accommodate this special case. Normally, these footprints would require switching to a different method, such as bilinear interpolation. By clamping the footprint, a bi-linear filter effect is achieved by using the same implementation. Once again based on hardware limitations, it may be less expensive to switch to bi-linear interpolation for cases when the footprint projects to a very small area. If a switch between two different sampling methods is done in the same image, a transition line is usually noticeable. By using a standard sampling method on an entire image, such transitions will not be apparent.

There are numerous ways in which to scale the pixel footprint, as illustrated in FIGS. 12a–12g. More specifically, this may be done, for example, in the following ways.

a) Scaling the bounding box's longer side to one texel in size.
   b) Scaling the bounding box's shorter side to one texel in size.
   c) Scaling the bounding box's diagonal to one texel in size.
   d) Scaling the pixel footprint's longer side to one texel in size.
   e) Scaling the pixel footprint's shorter side to one texel in size.
   f) Scaling the pixel footprint's major diagonal to one texel in size.
   g) Scaling the pixel footprint's minor diagonal to one texel in size.
   h) Scaling the pixel footprint by using a combination of the above, e.g.—the minimum of (e) or (g).

Next, at step 116, the proper texture Level Of Detail, LOD($\eta$), is determined and the required texel neighborhood is fetched. One method of determining the proper LOD, generally illustrated in FIG. 13, is to calculate the number of texels (T) that a given footprint covers in LOD(0)—that is, the finest texture map. If this number of texels exceeds a given, or allowable number of texels, then the next LOD is selected. This process is repeated until a preferred or permissible number of texels are located beneath the footprint, as shown in FIGS. 12a–12g.

The LOD level can also be determined by using a logarithmic method. With this method, the area of the projection of the pixel (as measured in texels) is estimated based on the bounding box, and that area of the projection of the pixel (again, as measured in texels divided by the maximum number of texels that can be fetched due to memory bandwidth constraints. Next, ($0.5 \times \log_2$) of the result of this division is calculated. Block 116 of flow diagram 100 is used to perform these two steps. After this division, a value of one is added to the integer portion of the result of this division, and this integer sum is used as the LOD value.

Figure 14A:
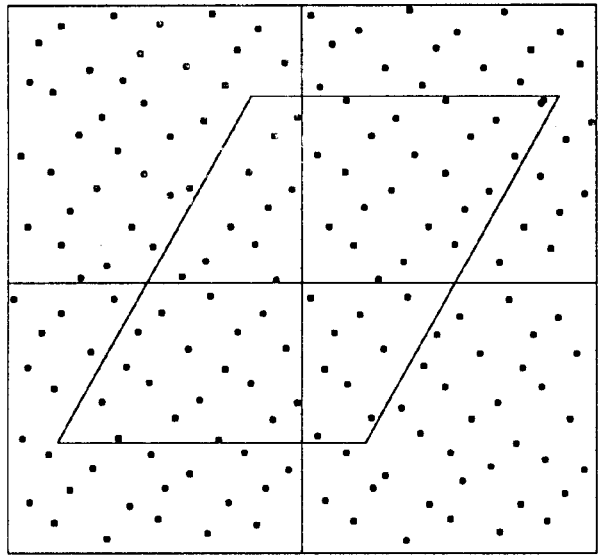
FIG. 14 shows two arrangements for distributing sample points relative to a pixel projection.

After the LOD level is determined, sampling points are generated and arranged stochastically either on the fly or from a lookup table. This may be done in a number of ways, as represented by steps 120 and 131 of FIG. 7. For instance, as illustrated in FIG. 14a, these points can be placed within the texel, and then each point can be tested using the un-normalized line equation to determine whether the point is in or out of the footprint.

Figure 17:
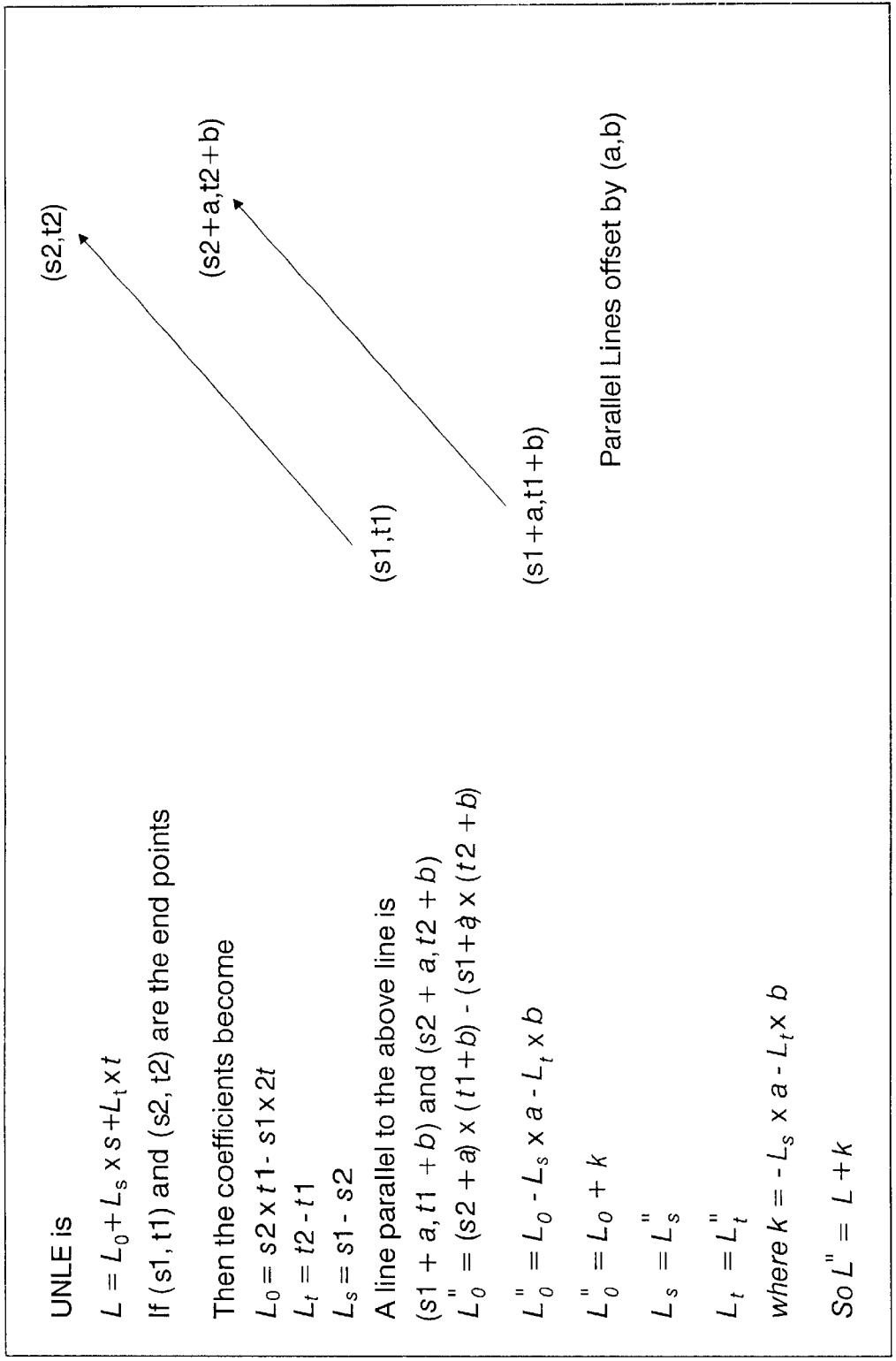
FIG. 17 demonstrates the relationship of parallel lines using the un-normalized line equation.

FIG. 17 illustrates generally the relationship of parallel lines using the un-normalized line equation. With reference to this Figure, the UNLE is:

$$L = L_0 + L_s \times s + L_t \times t$$

If $(s1, t1)$ and $(s2, t2)$ are the end points, then the coefficients become $$L_0 = s2 \times t1 - s1 \times t2$$

$$L_t = t2 - t1$$

$$L_s = s1 - s2$$

A line parallel to the above is:

$$(s1+a, t1+b) \text{ and } (s2+a, t2+b)$$

$$L''_o = (s2+a) \times (t1+b) - (s1+a) \times (t2+b)$$

$$L''_o = L_0 - L_s \times a - L_t \times b$$

$$L''_o = L_0 + k$$

$$L_s = L''_s$$

$$L_t = L''_t$$

where $k = -L_s \times a - L_t \times b$

So, $L'' = L + k$

Figure 14B:
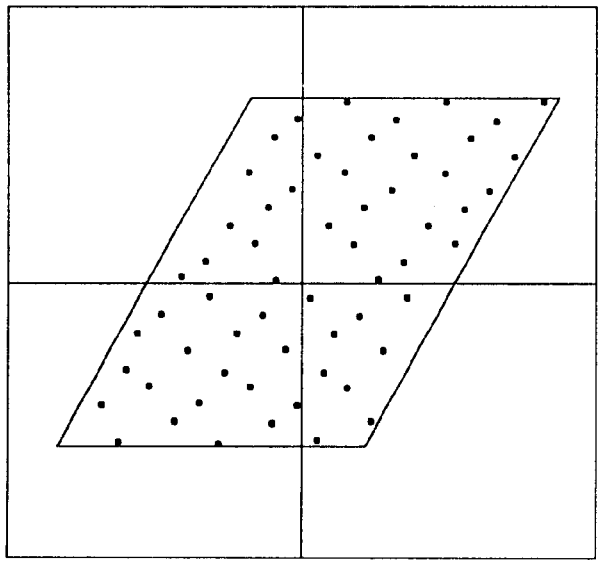

Another way to arrange the stochastically generated points, as illustrated in FIG. 14b, is to only sample within the pixel footprint, guaranteeing that every sample point is used. This is done by calculating the area of the pixel footprint, based on the partial derivatives. Then that area is used to determine the number of samples to place within the pixel. The samples are then stochastically distributed within the pixel.

Each of the above-described methods has its own computational merits but produces similar results. The choice of which method to use can be based on hardware limitations and expected requirements.

Figure 15:
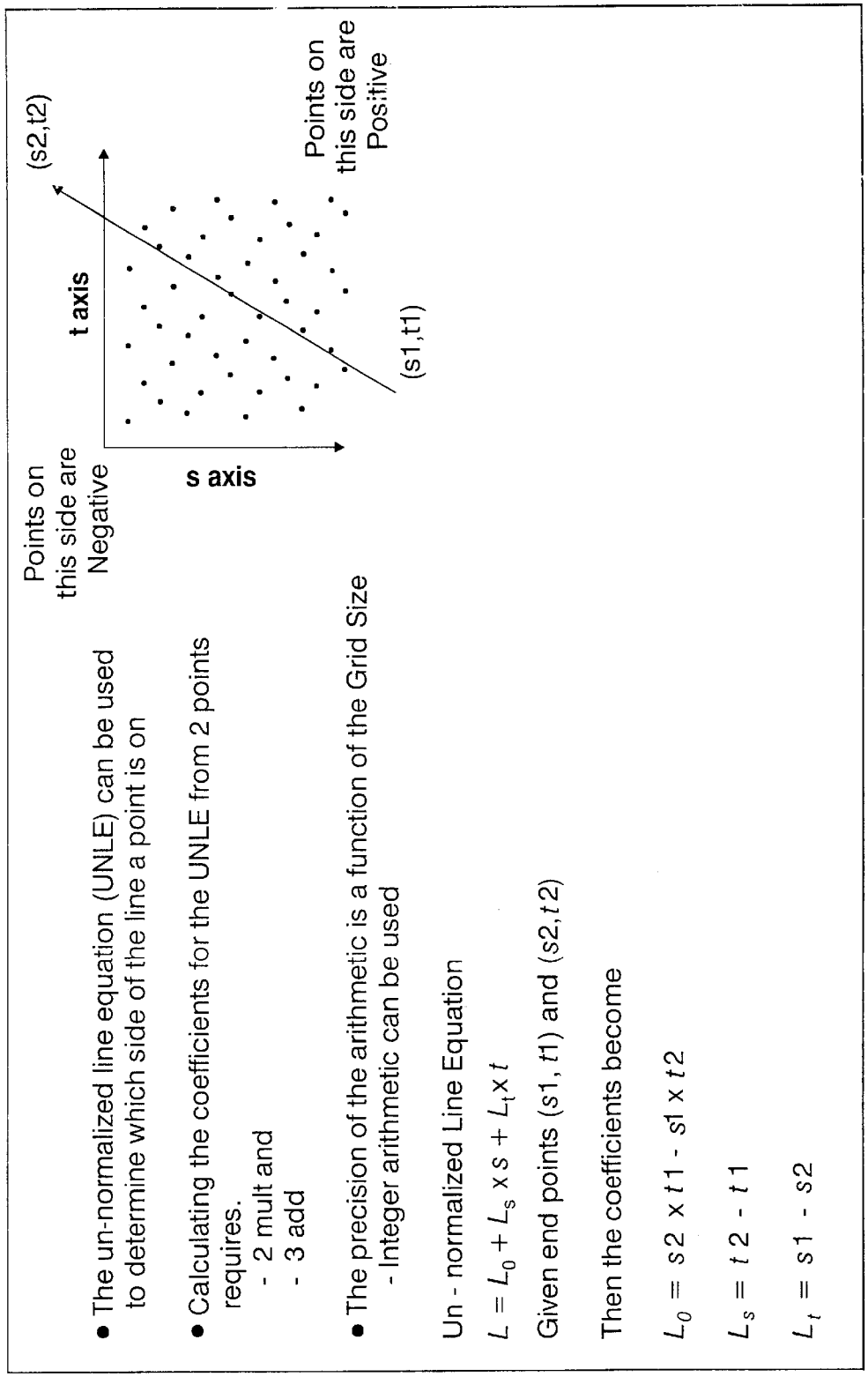

If the first of the aforementioned techniques of distributing sample points within the texel is used, then the following test is used. As represented by steps 122, 124 and 126 of FIG. 7, an un-normalized line equation is used to determine whether or not a sample point lies within the boundaries of the pixel footprint. The un-normalized line equation is used as shown in FIG. 15. With reference to FIG. 15, calculating the coefficients for the UNLE from two points requires two multiples and three adds. The precision of the arithmetic is a function of the grid size. Integer arithmetic can be used.

The un-normalized Line Equation is:

$$L = L_o + L_s \times s + L_t \times t$$

Given end points (s1, t1) and (s2, t2), then the coefficients become:

$$L_o = s2 \times t1 - s1 \times t2$$

$$L_s = t2 - t1$$

$$L_t = s1 - s2$$

The second of the aforementioned techniques for distributing sample points within the texel makes use of the gradient vectors. This technique is represented by step 130 of FIG. 7. The partial vectors, when used in the cross product, produce the area of the parallelogram they form. This allows a quick calculation of the area, requiring two multiplications and one addition.

$$Area_{parralelogram} = \left| \left( \frac{\partial s}{\partial i} \times \frac{\partial t}{\partial j} \right) - \left( \frac{\partial s}{\partial j} \times \frac{\partial t}{\partial i} \right) \right|$$

With reference to FIG. 10, (s,t) is in texture space and (i,j) is in viewpoint space.

Given the partial derivatives $$\frac{\partial s}{\partial i}, \frac{\partial t}{\partial i}, \frac{\partial s}{\partial j}, \text{ and } \frac{\partial t}{\partial j}.$$

The coordinates of each pixel (i,j) can be mapped → to texture space (s,t).

(i1,j1)→(s1,t1); (i2,j2)→(s2,t2); (i3,j3)→(s3,t3); (i4,j4)→(s4,t4); (s1,t1)=(0,0)

$$(s2, t2) = \left( \frac{\partial s}{\partial i}, \frac{\partial t}{\partial i} \right)$$

$$(s3, t3) = \left( s2 + \frac{\partial s}{\partial j}, t2 + \frac{\partial t}{\partial j} \right)$$

$$(s4, t4) = \left( \frac{\partial s}{\partial j}, \frac{\partial t}{\partial j} \right)$$

Then, based on the area, in texture space, the number of samples required for that pixel is calculated from the density of samples per texel. The samples are then placed, as represented by step 132 in FIG. 7. This may be done, for example, by using predetermined points from a look-up table. Alternatively, as represented by step 133 in FIG. 7, these points can be generated on the fly, by an error diffusion algorithm, such as the Floyd-Steinberg algorithm.

As represented by steps 124 and 126 in FIG. 7, with the aid of the four un-normalized line equations (UNLE), each describing an edge of the pixel footprint each sample point can be tested to determine whether it lies inside or outside the footprint, as illustrated in FIG. 15. These four UNLE's can be simplified to two equation by considering that the pixel footprint is a parallelogram and that two sets of the line equations are parallel, as illustrated in FIG. 16.

With reference to FIG. 16, the footprint of a pixel in texel space can be approximated by a parallelogram. Each of the four sides of the parallelogram is a line, which is described by an UNLE. A point is inside the parallelogram or footprint if all UNLE's yield a positive value. For example, p2 is inside (++++) and p1 is outside (−−++). If the UNLE is positive, one of the four bits associated with the point is set to 1. This process is done for each line equation. Those points with a value of 1111 or 15 are said to be inside the pixel footprint.

The total intensity value is, at step 134 in FIG. 7, now divided by the number of samples enclosed within the footprint. This normalized value as represented by step 136 in FIG. 7, may be used as the pixel intensity value—that is, the intensity at which the pixel is displayed on the display device. Often, however, the intensity value determined by the texturing process is itself further processed, as represented by step 140 of FIG. 7, to determine the intensity value at which the pixel is actually displayed. For example, the datum value determined by the texturing process may be modified to account for shading, reflections, or supplementary light sources.

The texturing process is repeated for subsequent pixels, as represented by step 142 of FIG. 7, until all the desired pixels have been textured.

The above-described procedure is a quality, cost effective anisotropic texture mapping method using constant density, stochastic sampling patterns in object space. The number of samples is proportional to the area of the pixel footprint in object space. This will cause the number of sample points to vary per pixel.

For the extreme anisotropic case, where the pixel footprint is long and thin, sample points are preferably randomly distributed to fill the footprint area. Also, preferably, the sample points should not be allowed to lineup into a straight line as in U.S. Pat. No. 5,651,104. These points should stay inside the footprint, but should not portray a uniform sampling pattern on a straight line. It should be perturbed in the direction of both the major and minor axis of the pixel footprint.

With the procedure of this invention, a pixel that maps into a quadrilateral other than a parallelogram and is sampled with an approximately uniform stochastic pattern, in texture space, will result in an non-uniform pixel sampling pattern density in pixel space.

In addition, as previously mentioned, when the pixel footprint projection is smaller than a texel at the finest texture resolution, the footprint is preferably clamped at a minimum size so as to produce a blending effect. The clamping can be done in the following ways:

a) By the bounding box: Longer side, Shorter side and Diagonal;

b) By the pixel footprint: Longer side, Shorter side, Major diagonal and Minor diagonal; and c) By a combination of two or more of these techniques.

In addition, preferably, the LOD calculation is based on the number of texels that lie within the pixel footprint projection. This is controlled by the maximum allowable number of texels that can be accessed from memory, per pixel rendering cycle.

The sampling rate of a pixel is a function of the area of the pixel footprint projection in texture space. Also, preferably, the stochastic sampling is continuous across all pixels in the polygon, with the density of that sampling varying as a function of each pixel's projection into texture space.

While it is apparent that the invention herein disclosed is well calculated to fulfill the objects previously stated, it will be appreciated that numerous modifications and embodiments may be devised by those skilled in the art, and it is intended that the appended claims cover all such modifications and embodiments as fall within the true spirit and scope of the present invention.

What is claimed is:

1. A method in a computer graphics display system for mapping texture anisotropically onto a group of pixels, wherein the computer graphics display system has texture values representing a texture map including an array of texels, the method comprising:

for each of the pixels, (a) determining a footprint of the pixel on the array of texels;

(b) using a stochastic sampling procedure to identify locations for a multitude of sample points in the footprint;

(c) maintaining the density of the sample points approximately constant throughout said footprint;

(d) assigning a value to each of the sample points based on the location of the sample point on the array of texels; and (e) determining a pixel intensity value using the values assigned to the sample points.

2. A method according to claim 1, wherein the step of determining the footprint of the pixel on the array of texels includes the step of identifying a projection of the pixel on the array of texels.

3. A method according to claim 1, wherein the step of determining the footprint of the pixel on the array of texels includes the step of identifying a projection of a quadrilateral pixel on the array of texels.

4. A method according to claim 2, wherein the determining step further includes the step of clamping the projection of the pixel to a minimum size.

5. A method according to claim 4, wherein:

the projection of the pixel on the array of texels has a length and a width: and the clamping step includes the steps of
  i) if the length of said projection is less than a first predetermined value, then setting the length of the projection to a predefined length value, and
  ii) if the width of said projection is less than a second predetermined value, then setting the width of the projection to a predefined width value.

6. A method according to claim 5, wherein:

each of the texels has a uniform texel width and a uniform texel length;

the predefined length value is the texel length; and the predefined width value is the texel width.

7. A method according to claim 1, wherein the step of using a stochastic sampling procedure to identify locations for a multitude of sample points in the footprint includes the steps of:

identifying a neighborhood on the texel array that includes the footprint;

using the stochastic sampling procedure to identify locations for a multitude of sample points in the neighborhood; and determining which ones of said sample points in the neighborhood are in said footprint.

8. A method according to claim 7, wherein the step of determining which ones of said sample points in the neighborhood are in said footprint includes the step of using an un-normalized line equation to determine which ones of said sample points in the neighborhood are in said footprint.

9. A method according to claim 1, wherein the step of using a stochastic sampling procedure to identify locations for a multitude of sample points in the footprint includes the steps of:

determining the area of the footprint;

determining the number of sample points to be located in said area; and stochastically distributing said number of sample points within the footprint.

10. A method according to claim 9, wherein the step of determining the area of the footprint includes the steps of:

determining first and second values representing the ratio of the pixel size to the texel size in first and second dimensions respectively; and using said first and second values to determine the area of the footprint.

11. Apparatus in a computer graphics display system for mapping texture anisotropically onto a group of pixels, the apparatus comprising:

a memory unit holding texture values representing a texture map including an array of texels;

means for using a stochastic sampling procedure to identify locations for a multitude of sample points in the footprint;

means for maintaining the density of the sample points approximately constant throughout said footprint;

means for assigning a value to each of the sample points based on the location of the sample point on the array of texels; and means for determining a pixel intensity value using the values assigned to the sample points.

12. Apparatus according to claim 11, wherein the means for determining the footprint of the pixel on the array of texels includes means for identifying a projection of the pixel on the array of texels.

13. Apparatus according to claim 12, wherein the means for determining further includes means for clamping the projection of the pixel to a minimum size.

14. Apparatus according to claim 13, wherein:

the projection of the pixel on the array of texels has an initial length and an initial width: and the clamping means includes
  i) means for setting the length of the projection to a predefined length value if the initial length of said projection is less than a first predetermined value, and
  ii) means for setting the width of the projection to a predefined width value if the initial width of said projection is less than a second predetermined value.

15. Apparatus according to claim 14, wherein:

each of the texels has a uniform texel width and a uniform texel length;

the predefined length value is the texel length; and the predefined width value is the texel width.

16. Apparatus according to claim 11, wherein the means for using a stochastic sampling procedure to identify locations for a multitude of sample points in the footprint includes:

means for identifying a neighborhood on the texel array that includes the footprint;

means for using the stochastic sampling procedure to identify locations for a multitude of sample points in the neighborhood; and means for determining which ones of said sample points in the neighborhood are in said footprint.

17. Apparatus according to claim 16, wherein the means for determining which ones of said sample points in the neighborhood are in said footprint includes means for using an un-normalized line equation to determine which ones of said sample points in the neighborhood are in said footprint.

18. Apparatus according to claim 11, wherein the means for using a stochastic sampling procedure to identify locations for a multitude of sample points in the footprint includes:

means for determining the area of the footprint;

means for determining the number of sample points to be located in said area; and means for stochastically distributing said number of sample points within the footprint.

19. Apparatus according to claim 18, wherein the means for determining the area of the footprint includes:

means for determining first and second values representing the ratio of the pixel size to the texel size in first and second dimensions respectively; and means for using said first and second values to determine the area of the footprint.

\* \* \* \* \*